…

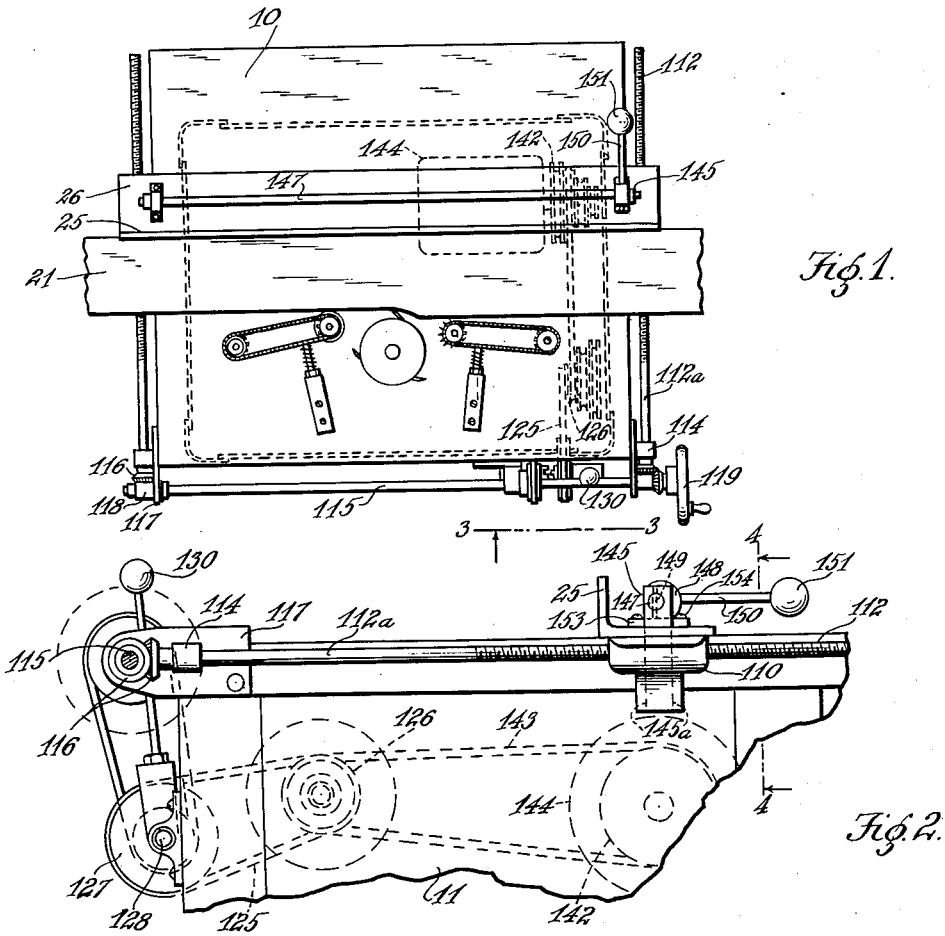

3,060,982
WORK GUIDE CONTROLS FOR EDGE PLANERS
Robert Glenn Patterson, 32 Chicago St., Plainfield, Ill.
Original application May 1, 1959, Ser. No. 810,373, now Patent No. 2,998,040, dated Aug. 29, 1961. Divided and this application Apr. 7, 1961, Ser. No. 101,582
3 Claims. (Cl. 144—253)

This invention relates to the edge planer covered in my co-pending application filed on May 1, 1959, under Serial No. 810,373 issued August 29, 1961, as Patent No. 2,998,040, and more particularly to the control of the backing guide or fence for the board to be planed. This application is a division of said application Serial No. 810,373.

Various means for adjusting a backing guide have come to my attention in planers, saw tables, and the like now on the market, but I find that many adjusting devices allow errors to occur in the alinement of the backing guide, so that the same assumes an uneven position. In other words, the feed of the backing guide is not uniform at both ends. Also, means now available for locking the guide at points in its adjustment are often inefficient and allow the slippage of the guide under the pressure of the edge planing operation. Some clamps even exert a shifting influence on the guide when they are being made fast, requiring the loosening of the clamps and re-setting of the guide.

In view of the above disadvantages, it is one object of the present invention to provide feed means for the backing guide which are positive and of a design suitable for securing accuracy and uniformity of the feed at both ends of the guide.

A further object is to provide a mechanism for the guide which may be adjusted manually in case the guide is to be given a short movement, with power means available for operating the guide in case it is to be moved a considerable distance.

Another object is to provide a compact and highly efficient device for locking the work guide at any point in its adjustment.

An additional object is to employ eccentric means for clamping the work guide at both ends to the planer table with a strong grip, and vertical pressure, so that no lateral or shifting urge will be transmitted to the guide to throw it out of line.

An important object is to accomplish the above advantages by means of parts which are sturdy, well balanced, and few in number.

The views in the accompanying drawing are identical with corresponding ones in the aforesaid application, except for size and the omission of some parts and reference numerals which need no mention in the present specification. Accordingly, in the drawing—

FIG. 1 is a top plan view of the planer, showing the work guide controls;

FIG. 2 is a side elevation of the work guide feed as seen from the line 2—2 of FIG. 3;

FIG. 3 is a front elevation of a mechanism seen from the line 3—3 of FIG. 1; and FIG. 4 is a section on the line 4—4 of FIG. 2.

Referring specifically to the drawing, 10 denotes the table of the planer, and 11 a fragment of its supporting structure. The board to be planed is shown at 21, and the backing guide or fence for the same is part of an angle rail 26 which is slidable between front and rear over the table 10.

As indicated in FIG. 2, the work guide or fence 25 has a tapped bearing 110 near each end for a pair of feed screws 112. These pass in shaft form 112a through journals 114 at the front end of the machine to be connected for joint rotation by a frontal shaft 115 through the agency of bevel gears 116. Brackets 117 from the table 10 carry the journals 114 and journals 118 for the frontal shaft, as seen in FIG. 1.

The shaft 115 carries a handwheel 119 at one end which is operated in case the work guide 25 is to be given a short movement. However, in case the work guide is to be moved a considerable distance, a power feed for the frontal shaft 115 is provided. Figs. 1 and 2 show a belt take-off 125 from a variable speed pulley 126 to a driving pulley 127 on a jack shaft 128 below the table. The pulley 127 is movable by means of a hand lever 130 and frame 131 to engage a clutch component 132 on the jack shaft 128 with a clutch component 133 on a companion jack shaft 135. A pulley 136 on the latter transmits a belt drive 138 to a pulley 139 on the frontal shaft 115. The power drive for the work guide can thus be engaged by the shifting of the hand lever 130. The jack shafts 128 and 135 are carried by frontal frame journals 140. The pulley 126 receives motion from a companion variable speed pulley 142 by way of a belt 143; and the pulley 142 is operated by a motor 144, these units being suitably secured in the frame of the planer.

FIGS. 2 and 4 show the details of the device for locking the work guide at any point in its adjustment. Thus, the base 26 of the work guide 25 carries journals 145 near its ends for a long shaft 147. The latter carries eccentrics 148, one of which receives a hand lever 150 headed by a ball 151; and the eccentrics are pinned through the shaft as shown at 149. They ride on wear pads 153 secured on the work guide base 26 by screws 154. The journals 145 depend in the form of vertical slides 145a, which operate in the screw bearings 110 and receive bottom blocks 156 on their inner sides secured by screws 157. The blocks are positioned just below side flanges 160 depending from the table 10. When the hand lever is in the vertical position, the eccentrics are low at the bottom and maintain the slide blocks 156 clear of the table flanges 160, so that the work guide is free to be moved forth and back. However, when the hand lever is swung down to the position shown in FIG. 2 after a desired placement of the work guide has been made, the eccentrics are high at the bottom and raise the blocks 156 into engagement with the table flanges 160. The work guide is now locked against movement.

It will now be apparent that the novel feed means for the work guide is well-balanced by locating the hand and power feed controls in front for handy access, while applying the feed at the end portions of the guide and in positions clear of the planer table. Further with the parts made as sturdy as indicated, they may be machined to make the guide feed accurate, positive and dependable for uniformity. Further, when a desired setting of the work guide has been obtained, the operation of a single control applies clamps at both ends of the guide to press the same tightly against the planer table in order to fix the adjusted position of the guide; and the eccentric medium of control is carried by the work guide and cannot therefore urge the same sidewise from the turning influence of the eccentrics. On the other hand, their influence is translated into the vertical motion of the slide blocks operable in the planer table and effective to press the guide tightly against such table. The aforesaid controls for the work guide are therefore of a highly efficient and reliable nature, and employ parts which are few in number and located clear of the working area of the planer table.

I claim:

1. In an edge planer or the like, control means for the work-backing guide of the planer table comprising a shaft extending along the front of the table to points beyond the sides thereof, a handwheel at one end of the shaft for operating the same, a pair of shafts along the sides of the table and geared to the first-named shaft to receive motion therefrom, portions of the second-named shafts being formed as screws, and bearings through which the screws are threaded, such bearings carried by the end portions of the guide, said guide being movable forth and back in parallelism to the work by the rotation of said screws, a control shaft extending along the guide, terminal eccentrics carried by the control shaft and resting on wear pads carried by the guide, journals for the control shaft adjacent to the eccentrics and extending downwardly with slides, bearings depending from the table and accommodating the slides for vertical movement, and side blocks carried by the slides at the bottom, the slides being lifted when the control shaft is rotated to make the eccentrics high at the bottom, whereby to make the blocks engage the table from underneath and lock the guide in place.

2. In an edge planer or the like, control means for the work-backing guide of the planer table comprising a shaft extending along the front of the table to points beyond the sides thereof, a handwheel at one end of the shaft for operating the same, a pair of shafts along the sides of the table and geared to the first-named shaft to receive motion therefrom, portions of the second-named shafts being formed as screws, and bearings through which the screws are threaded, such bearings carried by the end portions of the guide, said guide being movable forth and back in parallelism to the work by the rotation of said screws, a control shaft extending along the guide, terminal eccentrics carried by the control shaft and resting on wear pads carried by the guide, journals for the control shaft adjacent to the eccentrics and extending downwardly with slides, bearings depending from the table and accommodating the slides for vertical movement, side blocks carried by the slides at the bottom, and downward extensions of the table alongside the bearings, the slides being lifted when the control shaft is rotated to make the eccentrics high at the bottom, whereby to cause the blocks to engage the extensions from underneath and lock the guide in place.

3. In an edge planer or the like, control means for the work-backing guide of the planer table comprising a shaft extending along the front of the table to points beyond the sides thereof, a handwheel at one end of the shaft for operating the same, a pair of shafts along the sides of the table and geared to the first-named shaft to receive motion therefrom, portions of the second-named shafts being formed as screws, and bearings through which the screws are threaded, such bearings carried by the end portions of the guide, said guide being movable forth and back in parallelism to the work by the rotation of said screws, a control shaft extending along the guide, terminal eccentrics carried by the control shaft and resting on wear pads carried by the guide, journals for the control shaft adjacent to the eccentrics and extended downwardly with slides, bearings depending from the table and accommodating the slides for vertical movement, side blocks carried by the slides at the bottom, the slides being lifted when the control shaft is rotated to make the eccentrics high at the bottom, whereby to cause the blocks to engage the table from underneath and lock the guide in place, and a hand lever extended radially from one of the eccentrics and operable to rotate the control shaft as stated.

References Cited in the file of this patent
UNITED STATES PATENTS

| | | |
|---|---|---|
| 351,303 | Wood | Oct. 19, 1886 |
| 1,562,826 | Fager | Nov. 24, 1925 |
| 2,548,279 | Young | Apr. 10, 1951 |
| 2,830,629 | Deiters | Apr. 15, 1958 |
| 2,998,040 | Patterson | Aug. 29, 1961 |